(12) United States Patent
Williams et al.

(10) Patent No.: US 8,140,073 B2
(45) Date of Patent: Mar. 20, 2012

(54) METHOD AND SYSTEM FOR OPTIMIZED HANDOVER FOR MOBILE DEVICES (75) Inventors: Carl Williams, Palo Alto, CA (US); Robert Jaksa, Irving, TX (US)

(73) Assignee: FutureWei Technologies, Inc., Plano, TX (US)

( * ) Notice: Subject to any disclaimer, the term of this patent is extended or adjusted under 35 U.S.C. 154(b) by 677 days.

(21) Appl. No.: 11/753,488

(22) Filed: May 24, 2007

(65) Prior Publication Data

US 2007/0291717 A1 Dec. 20, 2007

Related U.S. Application Data

(60) Provisional application No. 60/814,681, filed on Jun. 16, 2006.

(51) Int. Cl.
*H04W 36/00* (2009.01)
*H04W 4/00* (2009.01)
*H04M 1/00* (2006.01)

(52) U.S. Cl. ............... 455/436; 455/552.1; 370/331

(58) Field of Classification Search ............ 370/331; 709/202, 203, 223, 245, 230, 231; 455/436, 455/552.1, 435.3, 433, 442, 445, 41.2, 527, 455/512

See application file for complete search history.

(56) References Cited

U.S. PATENT DOCUMENTS

| | | | |
|---|---|---|---|
| 6,466,964 B1 * | 10/2002 | Leung et al. | 709/202 |
| 6,487,605 B1 * | 11/2002 | Leung | 709/245 |
| 6,529,733 B1 | 3/2003 | Qing-An | |
| 6,907,501 B2 | 6/2005 | Tariq et al. | |
| 7,193,991 B2 | 3/2007 | Melpignano et al. | |
| 7,505,770 B2 * | 3/2009 | Funabiki et al. | 455/436 |
| 2002/0068567 A1 | 6/2002 | Johansson | |
| 2003/0224758 A1 | 12/2003 | O'Neill et al. | |
| 2004/0005893 A1 | 1/2004 | Isobe et al. | |
| 2005/0058100 A1 * | 3/2005 | Lee et al. | 370/331 |
| 2005/0288020 A1 | 12/2005 | Cho et al. | |
| 2006/0002344 A1 * | 1/2006 | Ono et al. | 370/331 |
| 2009/0141686 A1 * | 6/2009 | Funabiki et al. | 370/331 |

FOREIGN PATENT DOCUMENTS

| | | |
|---|---|---|
| CN | 1568028 A | 1/2005 |
| CN | 1599468 A | 3/2005 |
| JP | 2000-083273 A | 3/2000 |

* cited by examiner

*Primary Examiner* — Lester Kincaid
*Assistant Examiner* — Kuo Woo
(74) *Attorney, Agent, or Firm* — Slater & Matsil, L.L.P.

(57) ABSTRACT

Method and system for optimized handover for mobile devices. The present invention provides a method for providing wireless communication. The method includes providing a first access device and a second access device in a communication network. The first access device and the second access device are configured to provide wireless connectivity. The method also includes providing a mobile device that is wirelessly connected to the first access network using a first connection. The mobile device is connected to a communication network using a first address that is associated with the first access network. The first connection is associated with a first priority level. Moreover, the method includes detecting the second access device by the mobile device. The method further includes obtaining a second connection between the second access device and the mobile device. In addition, the method includes providing a second address that is associated with the mobile device and the second access network.

12 Claims, 7 Drawing Sheets

METHOD AND SYSTEM FOR OPTIMIZED HANDOVER FOR MOBILE DEVICES

CROSS-REFERENCES TO RELATED APPLICATIONS

This application claims priority to U.S. Provisional Application No. 60/814,681, filed Jun. 16, 2006, which is incorporated by reference herein.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The present invention relates generally to telecommunication techniques. More specifically, embodiments according to the present invention provide techniques for providing efficient and smooth communicational access for wireless devices. In particular, various embodiments according to the present invention are compatible with the mobile IPv6 standard. Merely by way of example, the invention has been applied to handover techniques for mobile devices. But it would be recognized that the invention has a much broader range of applicability.

In the past decade, communication technologies rapidly developed. Various communication mediums have been explored, ranging from power line, telephone line, optical line, to wireless communication. Most recently, wireless communication has become more and more popular and widely adopted for the convenience that it offers.

Wireless communication has many applications. Among other things, mobile phones that utilize wireless communication techniques are one of the most popular communicational devices, who claim billions of users today. Another popular application using wireless communication devices is mobile computing devices accessing local networks via wireless links. Through the local wireless networks, mobile computing devices are able to connect to the Internet using wireless internet protocol (IP) technology. Most recently, standard setting organizations such as the Internet Engineering Task Force (IETF) and Institute of Electrical and Electronics Engineers (IEEE) have developed and promoted various standards for wireless communication networks. For example, the IETF has developed a Mobile IP standard, which is a communications protocol that is designed to allow mobile device users to move from one network to another while maintaining a permanent IP address.

According to the Mobile IP standard, a mobile device can have two addresses: a permanent home address and a care of address (CoA). Typically, the permanent home address is associated with the home agent that mobile device is connected, and the CoA is associated with the network the mobile device is visiting. For example, a home agent stores information about mobile nodes whose permanent address is in the home agent's network.

To illustrate, a mobile device that needs to access an IP network uses the home address of the mobile device to send and/or receive packets. These packets are intercepted by the home agent, which uses a table and routes the packets to the mobile device's CoA with a new IP header. The new IP header is added to the packet so the original IP header is preserved. The packets are decapsulated and delivered to the mobile device at the end of the routing process, and the added IP header is removed.

When acting as a sender, the mobile device simply sends packets directly to the other communicating node through the access router.

In a typical Mobile IP protocol, various procedures and messages are defined. For example, an authenticated registration procedure is used so that a mobile device informs its home agent(s) of its care-of-address"(es). An extension to ICMP Router Discovery is employed to allow mobile devices to discover prospective home agents. The rules for routing packets to and from mobile nodes, including the specification of one mandatory routing mechanism and several optional routing mechanisms.

Of course, for the scheme described above to work, it is a prerequisite that mobile devices are able to move from the HA to a foreign network. Over the past, various conventional techniques have been developed in accordance with the Mobile IP protocol to allow mobile devices users to move from one network to another using handover processes. Unfortunately, these conventional techniques are often inadequate.

Therefore, improved methods and system for performing handover is desired.

BRIEF SUMMARY OF THE INVENTION

The present invention relates generally to telecommunication techniques. More specifically, embodiments according to the present invention provide techniques for providing efficient and smooth communicational access for wireless devices. In particular, various embodiments according to the present invention are compatible with the mobile IPv6 standard. Merely by way of example, the invention has been applied to handover techniques for mobile devices. But it would be recognized that the invention has a much broader range of applicability.

According to an embodiment, the present invention provides a method for providing wireless communication. The method includes providing a first access device and a second access device in a communication network. The first access device and the second access device are configured to provide wireless connectivity. The method also includes providing a mobile device that is wirelessly connected to the first access network using a first connection. The mobile device is connected to a communication network using a first address that is associated with the first access network. The first connection is associated with a first priority level. The method further includes detecting the second access device by the mobile device. The method additionally includes determining whether to connect to the second access device based on a first condition. The method also includes obtaining a second connection between the second access device and the mobile device. Moreover, the method includes providing a second address that is associated with the mobile device and the second access network. Also, the method includes sending a registration message to a home agent. The registration message includes at least the first address, the second address, and information associated with the first connection and the second connection. The method additionally includes assigning a second priority level to the second connection. For example, the second priority level is higher than the first priority level.

The method further includes setting a lifetime associated with the first connection. The method further includes routing packet data for the mobile device by the home agent to the second access network.

According to another embodiment, the present invention provides a system for providing wireless communication in compliance with an Mobile IP standard The system includes a mobile device that is configured to perform wireless communication. The mobile device is associated with a first unique identification. The system also includes a first server that is configured to provide a first connection for the mobile device using a first address. The first address is associated with the first unique identification. The first connection is associated with a first priority level. The system also includes a second server that is configured to provide a second connection for the mobile device using a second address. The second address is associated with a second unique identification. The second connection is associated with a second priority level. The system further includes a third server that is configured to store information associated with the first connection and the second connection. The third server is further configured to receive a first data packet to be received by the mobile device. Moreover, the third server selects the first server if the first server the first priority level is higher.

According to yet another embodiment, the present invention provides a method for providing wireless communication. The method includes providing a first access device and a second access device in a communication network. The first access device and the second access device are configured to provide wireless connectivity. The method also includes providing a mobile device that is wirelessly connected to the first access network using a first connection. The mobile device is connected to a communication network using a first address that is associated with the first access network. The first connection is associated with a first priority level. Moreover, the method includes detecting the second access device by the mobile device. The method further includes obtaining a second connection between the second access device and the mobile device. In addition, the method includes providing a second address that is associated with the mobile device and the second access network. Moreover, the method includes storing the first address and the second address by a home agent. The method additionally includes assigning a second priority level to the second connection. The second priority level is higher than the first priority level. The method further includes receiving a first data packet that is for the mobile device. Moreover, the method includes routing packet for the mobile device by the home agent based on the first priority level and the second priority level. Also, the method includes causing a termination of the first connection within a predetermined time.

Many benefits are achieved by way of the present invention over conventional techniques. For example, the present technique provides an easy to use technique that is both better and compatible with conventional techniques and network standards. In some embodiments, the method provides a novel seamless and quick handover process for mobile device. By practicing embodiment of the present invention, latency time associated with handover is substantially reduced. Additionally, the method provides a process that is compatible with conventional process technology without substantial modifications to conventional equipment and processes. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DETAILED DESCRIPTION OF THE INVENTION

The present invention relates generally to telecommunication techniques. More specifically, embodiments according to the present invention provide techniques for providing efficient and smooth communicational access for wireless devices. In particular, various embodiments according to the present invention are compatible with the mobile IPv6 standard. Merely by way of example, the invention has been applied to handover techniques for mobile devices. But it would be recognized that the invention has a much broader range of applicability.

As explained above, various standards, such as the Mobile IP standard, allow mobile device users to move from one network to another while maintaining a permanent IP address. There are various conventional techniques to allow users to move from one network to another, which is usually accomplished using a handover processes. Typically, a handover process performed in the Mobile IP environment takes a few seconds. However, these conventional techniques have become inadequate for real time applications. Mobile computing devices, such as personal computer, person digital assistant, and even cell phones, are evolved to become multifunctional. In addition to surfing the web via IP connection, these devices are also used for voice communication. For example, voice-over-IP (VoIP) communication has been a popular application. For this type of application, it is important to maintain IP connection through a phone call. Typically, it is required that a handover process to be completed within three hundred milliseconds or less so that users do not notice delay and/or silence during a VoIP session. In addition, other types of applications, such as real time online video, real time audio, demand short switching time for handover processes as well. Usually, moving from one network to another gives rise to a handover process which would incur packet losses and severe end to end TCP performance degradations for the mobile device. For example, studies on handover latency effects on the Mobile IPv6 devices show that conventional devices according to the Mobile IPv6 are unable to support real-time applications.

It is therefore to be appreciated that various embodiments of the present invention provides a more efficient techniques for performing handover. For example, in a mobile IP environment, a handover process for a mobile device can be performed for less than three hundred milliseconds, which allows the user to continue her real time applications while the handover process is performed. In a specific embodiment, the present invention is compatible with the Mobile IPv6 standard. More specifically, embodiments of the present invention utilize a make-before-break scheme for performing handover processes.

Make-before-break process has been used in certain network standards. For example, the IEEE Std 802.16e-2005 defines a make-before-break (MBB) handover (HO) as an HO where service with the target base station (BS) starts before disconnection of the service with the previous serving BS. This type of MBB is defined at layer 2 (i.e., OSI layer 2 or data link layer). In contrast, embodiments of the present invention proposes a layer 3 (i.e., OSI layer or network layer) Mobile IPv6 "Make before break" handover, which is defined for setting up simultaneous independent IP connections.

While it is understood that various embodiments of the present invention apply to a wide variety of network standards and protocols, certain specific embodiments are implemented in conjunction with the Mobile IPv6 standard, which entails defining the specification and behavior of the Mobile IPv6 standard. These specific embodiments should not unduly limit the scope of claims.

During the handover process, a mobile device is wirelessly connected to one or more wireless servers (e.g., home agent). Typically, the Mobile IPv6 home agent (HA) needs to be able to continue to receive packets from the old and new points of attachment (e.g., care-of address) at the IP level, for which multiple bindings are required. For example, this is different from bi-casting, as there is no need to send duplicate packets down multiple interfaces (that could be an option, but certainly not required).

In certain situations, the "Make Before Break" scheme becomes a multi-homing problem. For example, layer 2 establishes 2 sessions simultaneously for a period of time until the new session is fully up and operational. In contrast, techniques according to the present invention is implemented in conjunction with layer 3 Mobile IPv6 based "Make Before Break" as a multi-homing problem.

Figure 1:
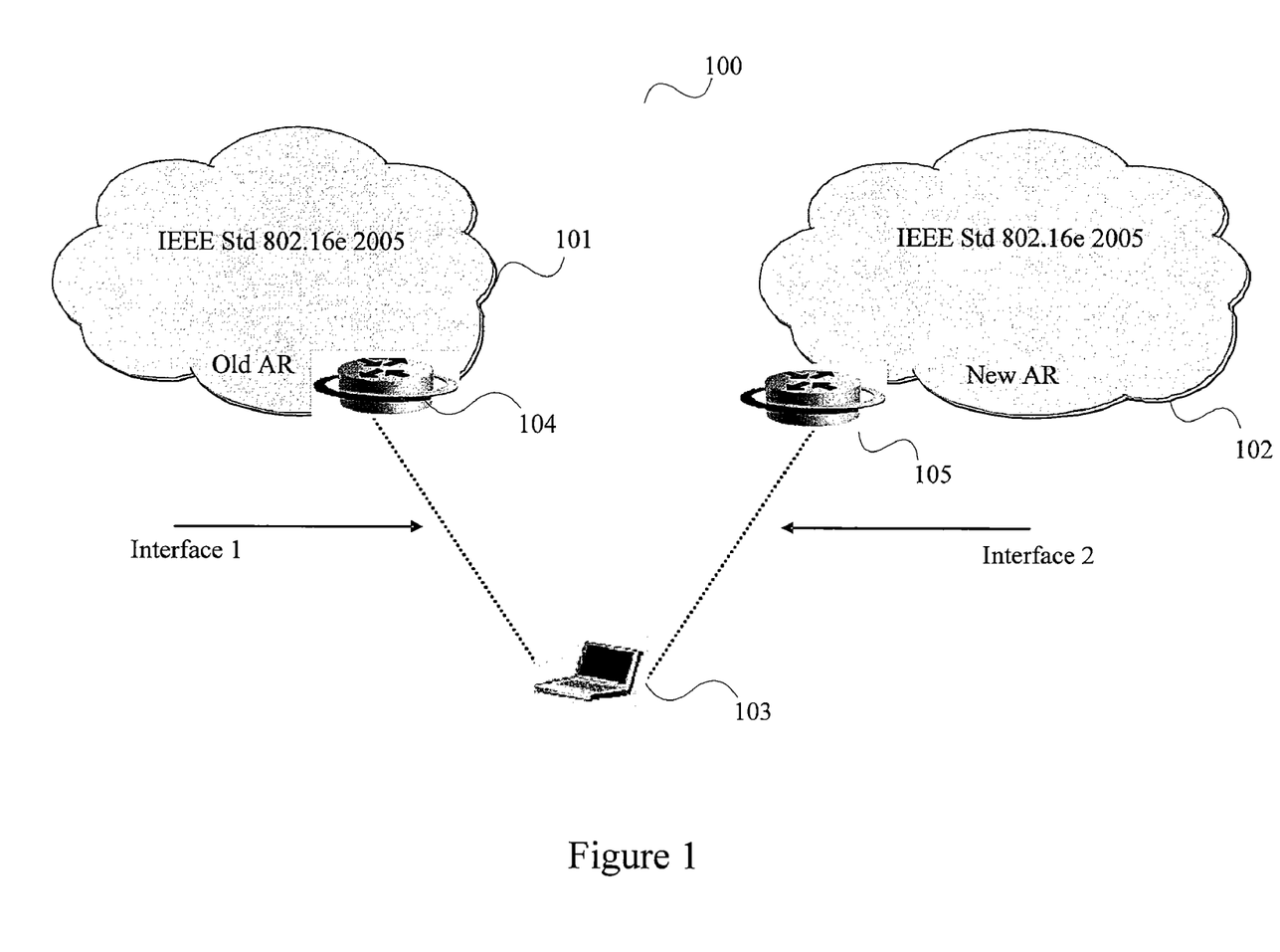
FIG. 1 is a block diagram illustrating a network system according to an embodiment of the present invention.

FIG. 1 is a block diagram illustrating a network system according to an embodiment of the present invention. This diagram is merely an example, which should not unduly limit the scope of the claims. One of ordinary skill in the art would recognize many variations, alternatives, and modifications. As shown in FIG. 1, a wireless network system includes a mobile device 103, access routers 104 and 105. It is to be understood that access routers are access devices that provide wireless access to mobile devices. The access routers 104 and 105 are configured to provide wireless access to mobile devices. For example, the access routers include base stations for providing radio access to a variety of mobile devices. According to various embodiments, the access routers are compatible with the Mobile IP protocol. Depending on the application, the access routers are compatible with other types of network standards and/or protocols, such as WiFi, WiMAX, IEEE 802.16, etc. The routers as shown are concurrently providing radio access to the mobile device 103. The mobile device 103 is capable to wireless connect to two or more wireless networks. For example, the mobile device 103 is a laptop computer that is equipped with a WiMAX wireless network component that allows the mobile device 103 to be connected to one network while listening for other wireless networks. In another example, the mobile device 103 in compliance with the WiFi standard, and the mobile device 103 is able to connect to one network while listening to another by having two or more WiFi network interfaces.

The mobile device 103 is connected to the access router 104, which provides wireless access within a serving area. For example, the serving area is the area 101. The mobile device 103 is also within a serving range of the access router 105. Since the mobile device 103 is able to obtain wireless access from both access routers, the mobile device 103 may choose to use the access router 105 for wireless access instead of the access router 104. According to an embodiment of the present invention, the mobile device 103 detects and compares signal strengths from both access servers. For example, the mobile device 103 decides to switch from the access server 104 to the access server 105 if the signal strength of the access server 105 is greater than the signal strength of the access server 104. The mobile device 103 may decide to switch from one access router to another for other reasons as well.

Once the mobile device 103 determines that a switch is to be made, the mobile device 103 first establishes an IP connection with the access server 105. For example, the IP connection is not used for actually IP connection to the Internet, but is a part of the handover process. For a brief period of time, the access routers offer simultaneous support for the Mobile IPv6 protocol to work with both interfaces. In contrast to conventional techniques, embodiments of the present invention offers a general multi-homing solution, which does not tear down the connection between the mobile device 103 and the access router 104 before a connection is established between the access router 105 and the mobile device 103.

Figure 2:
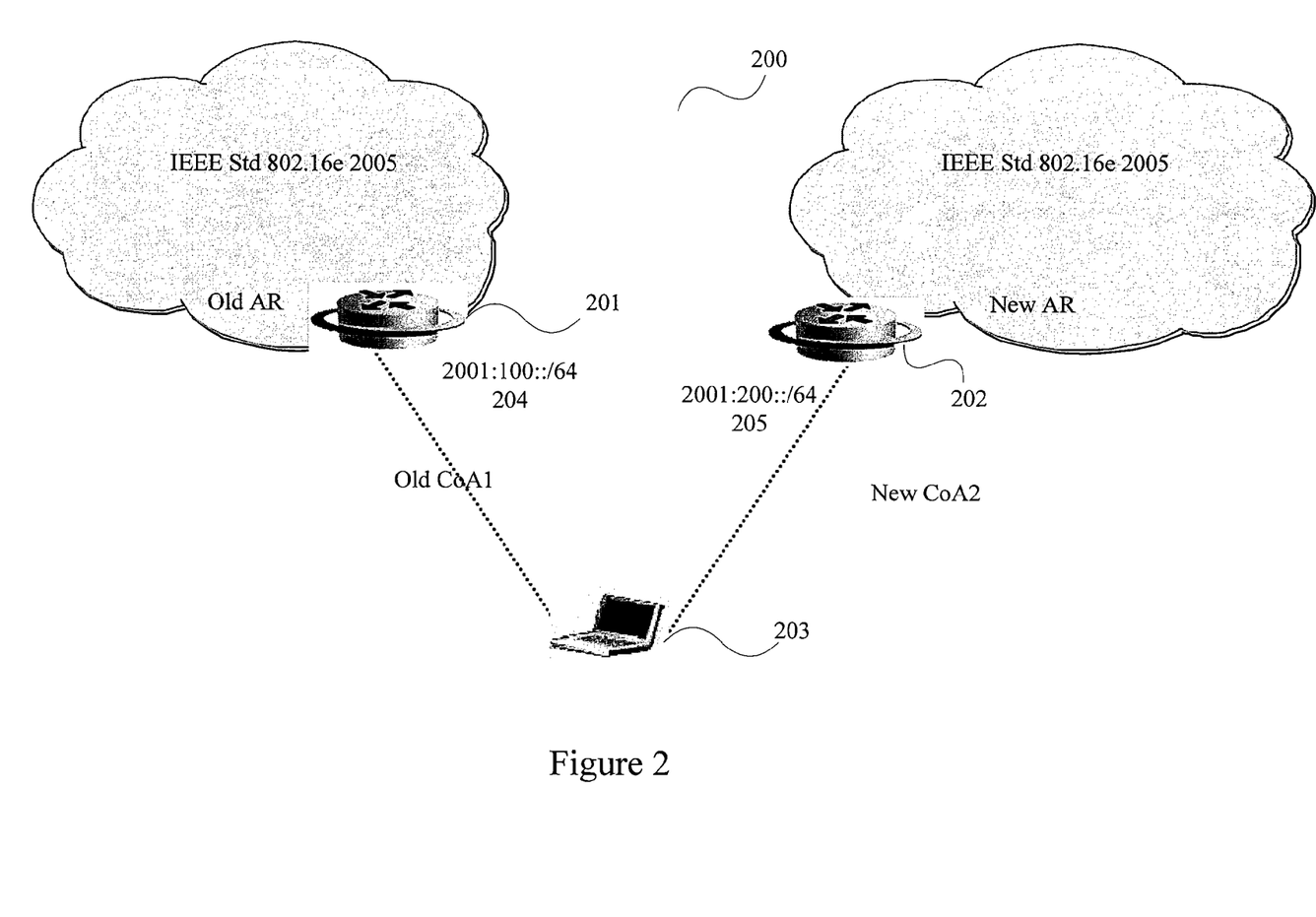
FIG. 2 is a simplified diagram illustrating a handover process according to an embodiment of the present invention.

FIG. 2 is a simplified diagram illustrating a handover process according to an embodiment of the present invention. This diagram is merely an example, which should not unduly limit the scope of the claims. One of ordinary skill in the art would recognize many variations, alternatives, and modifications. As shown, a network system 200 includes a mobile device 203 and access routers 201 and 202. The mobile device 203 is connected to the access router 201. The mobile device 203 is also capable of connecting to the access router 202 at the same time. To accomplish this, the mobile device 203 is assigned multiple CoA (MCoA). As an example, the mobile device 203 has a CoA of 2001:100::/64 associated with the access router 201. In addition, the mobile device 203 also has a CoA of 2001:200::/64 associated with the access router 202. The mobile device 203 becomes assigned with MCoA after it is connected to more than one access devices (i.e., access routers). For proper routing of data packets, it is then important to determine through which router the packets are sent to the mobile device 203.

According to the present invention, the routing of data packet is determined by a home agent, which determines which access router to send access data based on a priority scheme.

Figure 3:
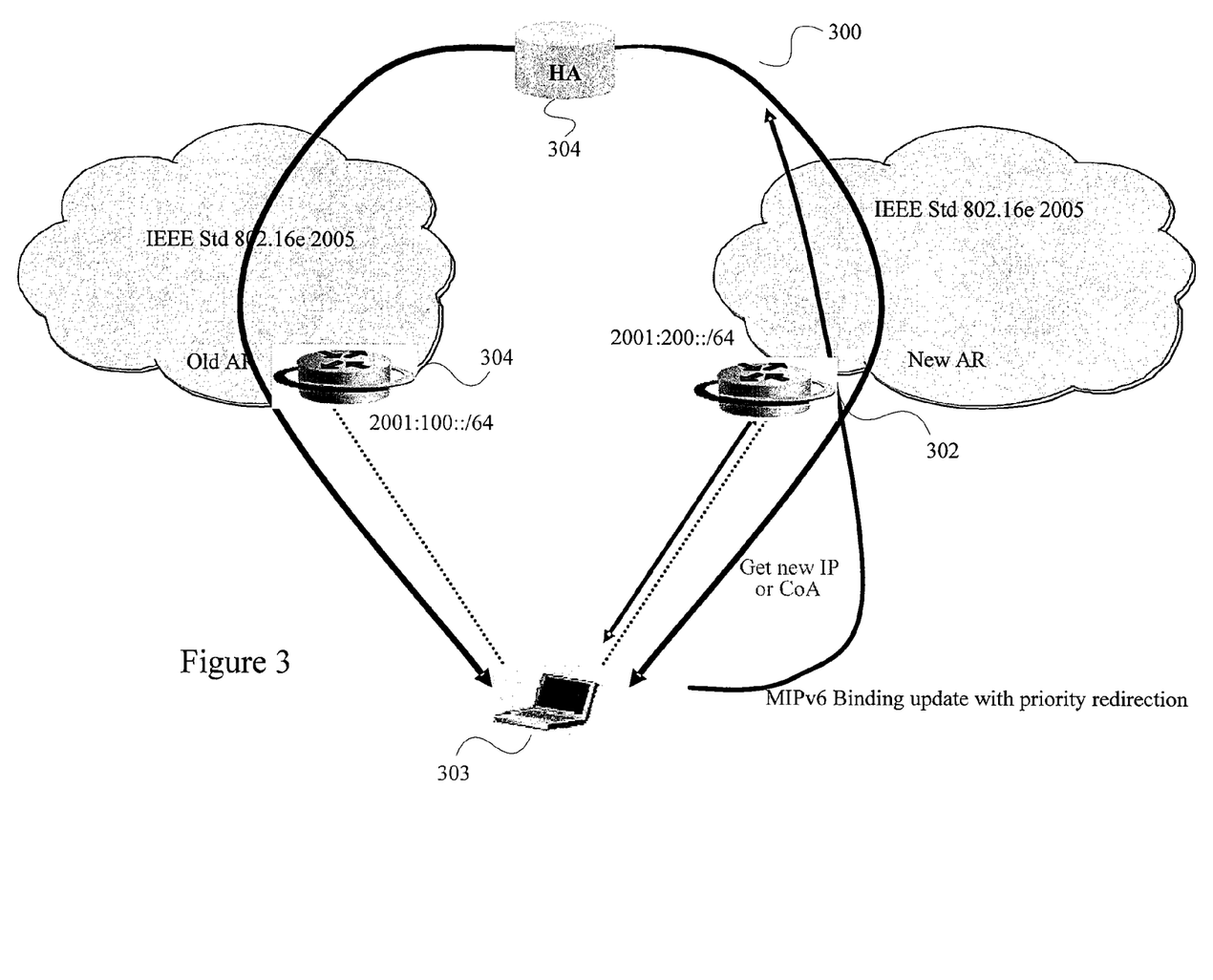
FIG. 3 is a simplified block diagram illustrating routing of packet data according to an embodiment of the present invention.

FIG. 3 is a simplified block diagram illustrating routing of packet data according to an embodiment of the present invention. This diagram is merely an example, which should not unduly limit the scope of the claims. One of ordinary skill in the art would recognize many variations, alternatives, and modifications. As shown in FIG. 3, a wireless network system 300 includes access routers 301 and 302, a mobile device 303, and a home agent (HA) 304. As shown, the mobile device 303 is connected to the access router 301 using the CoA address of 2001:100::/64. For example, the CoA address is associated with both the address of the access router 301 and an identification of the mobile device. The mobile device 303 is in a process of connecting to the access router 302. For example, the mobile device 303 is compatible with the Mobile IPv6 standard for connecting different access routers. In establishing a connection between the mobile device 303 and the access router 302, the mobile device 303 is assigned a CoA address 2001:200::/64. The HA 304 maintains a table (e.g., Table 1 as shown below) as where to route data packets that are designated for the mobile device 303.

TABLE 1

| Home address | CoA | BID | Priority |
|---|---|---|---|
| 3ffe::2 | 2001:100::2 | 776 | 5 |
| 3ffe::2 | 2001:200::2 | 777 | 6 |

Merely as an example, the HA assigns a higher priority value for the access router 302 than the priority value for the access router 301. As a result, data packets for the mobile device 303 are routed through the access router 302. Depending on the application, other implementations are available. For example, the HA 304 may simply delete table entries associated with the access router 301, thereby routing all data packets to be routed to the access router 302.

In a specific embodiment, the "priority" field of the MCoA specification is to redirect all flows that come in from the Mobile IPv6 Home Agent. For example, it is defined that the higher value of the priority field means a higher priority. This means that the method has the effect of directing all packets destined to this home address with the higher priority (higher priority integer) over the other MCoA entry must be directed to the Care-of Address associated with this MCoA binding entry. The net result is that packets for the mobile device that is performing a handover (i.e., Make before Break) redirected to the new CoA. Thus, at some pointed (which is defined in the next section of this patent) all IP communication on the old interface (old CoA) will cease.

As an example, the priority field is stored by a binding cache of the Mobile IPv6 home agent. As another example, the priority field is stored at the Mobile IPv6 correspondent node (CN). The priority field provides to the HA and/or CN where to redirect the traffic flow. In an embodiment, the redirection of the traffic flow is dynamic and is transparent to the application. For example, the Mobile IPv6 mobile device communicates this redirection information to the HA or CN via a binding update message with the MCoA and with the new priority value. As merely an example, the priority value is a higher integer value than the priority value for the previous interface. As a result, when a handover occurs, a new priority value is generated that is to be higher than the previous one. In the event of loop around, both binding entries are updated. (e.g., the new connection has an integer value greater than the old one).

The Mobile IPv6 standard enables a mobile device to maintain its connectivity to the Internet when moving from one access router to another. This is a process commonly referred to as a handover. According to convention techniques, the handover causes a period during which the mobile device is unable to send or receive packets because of link switching delay and IP protocol operations. This "handover latency" resulting from standard Mobile IPv6 procedures, namely movement detection, new Care of Address configuration, and Binding Update, is often unacceptable to real-time traffic such as Voice over IP. It is to be appreciated that the handover process as described above according to the present invention reduces the handover latency, which could be beneficial to non-real-time, throughput-sensitive applications as well.

According to embodiments, the present invention is in compliance with the Mobil IPv6 standard. By defining addition field tags and procedures, embodiments of the present invention can be applied in conjunction with the Mobile IPv6 standard.

Figure 4:
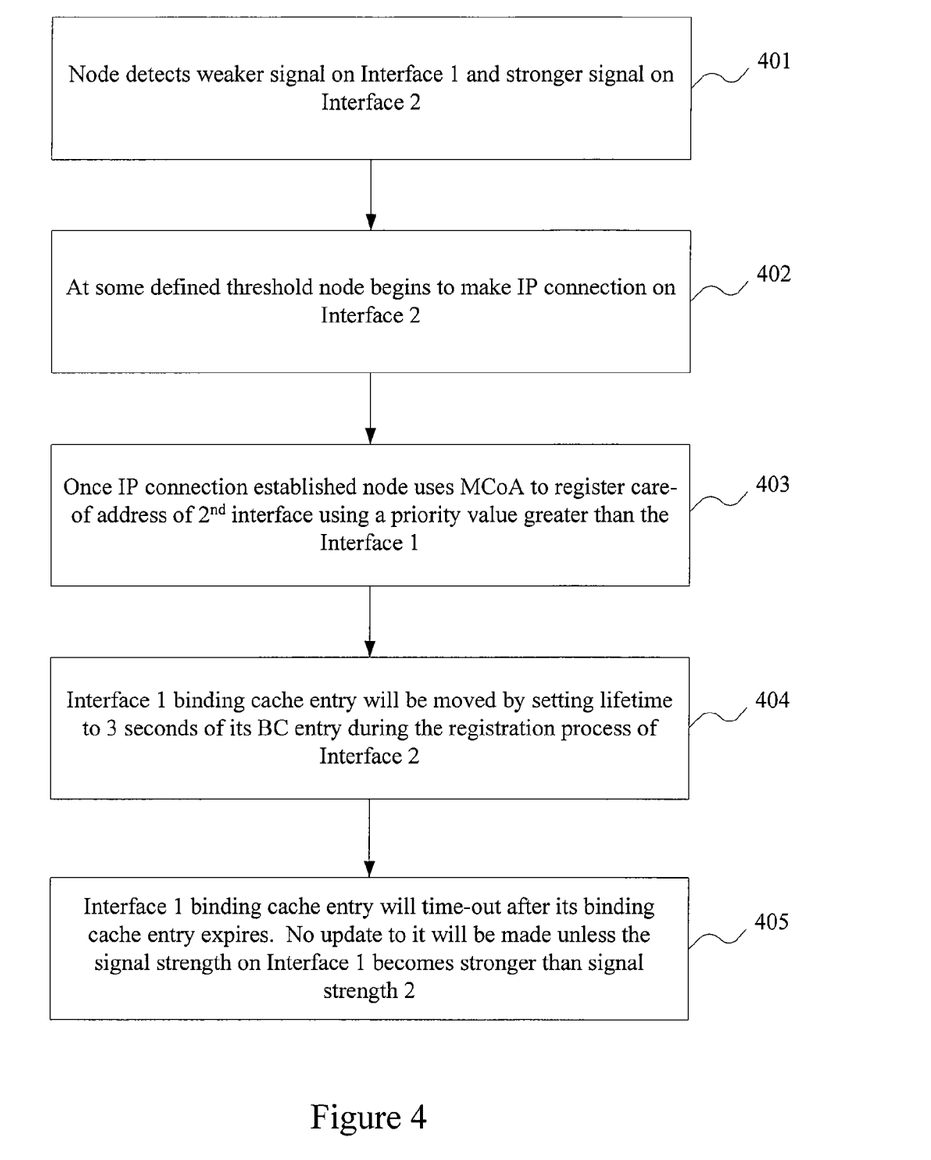
FIG. 4 is a simplified diagram illustrating a handover process according to an embodiment of the present invention.

FIG. 4 is a simplified diagram illustrating a handover process according to an embodiment of the present invention. This diagram is merely an example, which should not unduly limit the scope of the claims. One of ordinary skill in the art would recognize many variations, alternatives, and modifications. For example, various steps as illustrated in FIG. 4 may be added, removed, replaced, rearranged, repeated, overlapped, and/or partially overlapped.

At step 401, a mobile device detects two signals from two different access devices (i.e., access routers). As described above, the mobile device is capable of having radio access to multiple access devices. For example, the mobile device is a WiMAX compatible device that is able to connect to one access device (e.g., via interface 1) while listening to wireless signals from other access devices (e.g., via interface 2). In a specific example, the mobile device is a laptop computer that has multiple WiFi network interfaces (i.e., multiple WiFi cards) for connecting and/or listing to two or more access devices and/or access networks. In addition to be able to receive signals from two or more access devices, the mobile device is also capable of determine signal strengths (and/or other characteristics) for each of the access devices. For example, the mobile device determines signal strength from each access device measured in dB. As another example, the mobile device determines the traffic condition for each of the access device.

At step 402, the mobile device connects to an access device different which the mobile device has already connected to if one or more condition is satisfied. For example, the mobile device, which is connected to an access device (e.g., access router 301 in FIG. 3) via the interface 1 and listens to another access device (e.g., access router 302 in FIG. 3) via the interface 2, determines to switch from interface 1 to interface 2 based on a determination that signal strength level from the interface 2 is higher than a threshold level. Depending on the application, other criteria may be used. For example, one condition is that the signal strength level from the interface 2 is greater than the signal strength level from the interface one. As another example, a condition is that the second access device has more bandwidth than the first access device.

To connect to the other access device, the mobile device establishes an IP connection with that access device. For example, the IP connection is in accordance with the Mobile IP (and/or Mobile IPv6) protocol, in which the mobile device is assigned a new CoA that for the connection between the mobile device and the access device. As explained above, the CoA is typically associated with an address of the access device and the ID of the mobile device.

At step 403, an MCoA for the mobile device is registered at a network server. For example, the network server is a home agent that stores network policies and routing information for mobile devices and access devices. As merely an example, the network server is the home agent 304 as shown in FIG. 3. The network server is configured to store information associated with mobile devices. For example, the network server stores MCoA using a scheme that is substantially similar to the Table 1 above. The network server registers the new CoA address for the mobile device. In addition, the network server assign a priority level to the new CoA address, which addition future incoming data packets for the mobile device to be routed via the newly established connection.

At step 404, the network server initiates a process for terminating connection between the mobile device and the old access device. According to a specific embodiment, the network servers sets an internal timer (e.g., for two seconds), and the expiration of which causes the network server to remove information (e.g., CoA, priority information, etc.) for the connection between the mobile device and the old access server. As a result, data packets can no longer be routed through the old access device after the expiration of the timer. According to another embodiment, the network server sets an internal timer, and the expiration of which causes the network server to send a message to the old access device to release network resources associated with serving the mobile device.

At step 405, entries associated with the connection between the mobile device and the old access device is terminated. As described above, the termination is caused by the expiration of the timer. Once the entries are terminated, no update will be made for this connection. However, if later the mobile device moves a different location where the signal strength from the old access device is stronger, then a new entry for the connection between the mobile device and the old access device may be created again.

Figure 5:
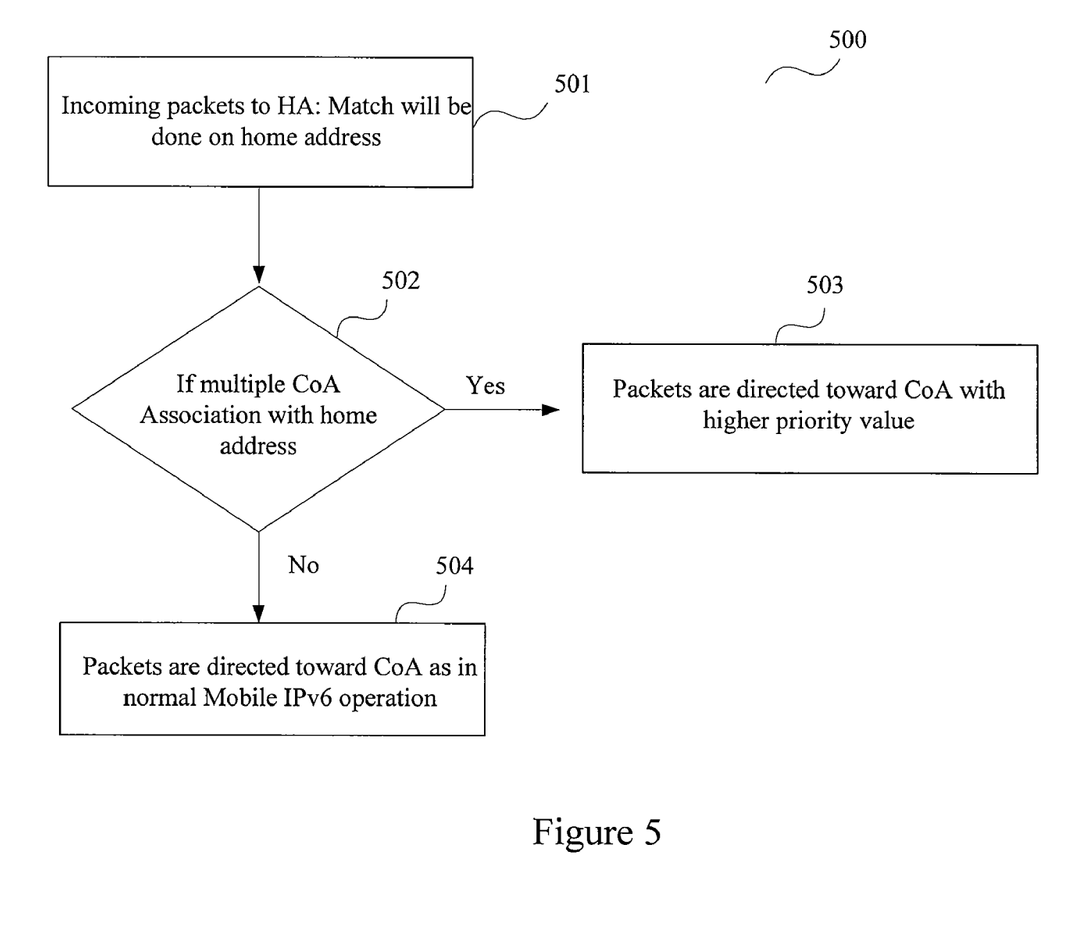
FIG. 5 is a simplified diagram illustrating the operation of routing data packets according to an embodiment of the present invention.

FIG. 5 is a simplified diagram illustrating the operation of routing data packets according to an embodiment of the present invention. This diagram is merely an example, which should not unduly limit the scope of the claims. One of ordinary skill in the art would recognize many variations, alternatives, and modifications. For example, various steps as illustrated in FIG. 5 may be added, removed, replaced, rearranged, repeated, overlapped, and/or partially overlapped. Merely as an example, the process as shown in FIG. 5 may be practiced using the system illustrated according to FIG. 3.

At step 501, data packets destined for a mobile device is routed through a home agent. For example, the home agent is a network home agent server that is in compliance with the Mobile IP standard. According to a specific embodiment, the home agent stores routing information associated with access routers and mobile devices. For example, each mobile device may have multiple entries related to routing. For example, the home agent has a look up table for each mobile device. When a data packet comes in, the home agent determines to which mobile device and through which access router the data packet is to be sent.

At step 502, the home agent determines if mobile device has more than one CoA. For example, the home agent determines that the mobile device has an MCoA. If the mobile device has an MCoA, the process proceeds to step 503. On the other hand, if the mobile device only has a single CoA, the process proceeds to step 504.

At step 503, the home agent determines through which access router to send data packets to mobile devices. The home agent looks up the table associated with the mobile device. Since the mobile device is associated with an MCoA, there are more than one access routers to send packet to the mobile device. The home agent chooses the access router for routing data packets based on the priority levels of the access routers. For example, the packet data are routed to access routers that are associated with higher priority level.

At step 504, the home agent routes data packet through the access router as identified by the CoA address.

Figure 6:
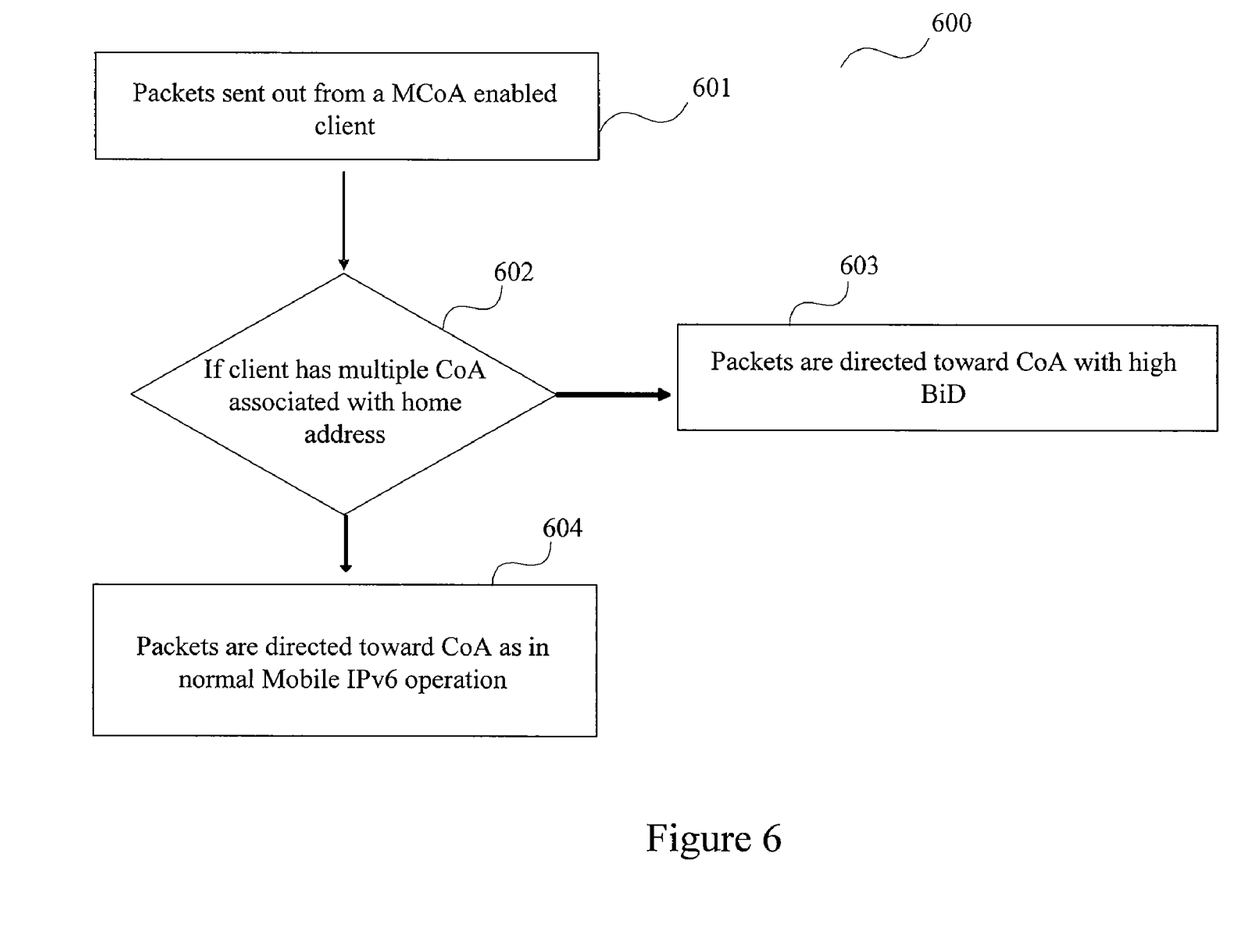
FIG. 6 is a simplified diagram illustrating the operation of routing data packets according to an embodiment of the present invention.

FIG. 6 is a simplified diagram illustrating the operation of routing data packets according to an embodiment of the present invention. This diagram is merely an example, which should not unduly limit the scope of the claims. One of ordinary skill in the art would recognize many variations, alternatives, and modifications. For example, various steps as illustrated in FIG. 6 may be added, removed, replaced, rearranged, repeated, overlapped, and/or partially overlapped. Merely as an example, the process as shown in FIG. 6 may be practiced using system 300 in FIG. 3.

At step 601, the outgoing flow of a packet is matched using the home address. At step 602, it is determined if the home address is associated with more than one CoA. If there are more than one CoA, at step 603 the CoA with the higher priority value is chosen. However, if there is only one CoA for the home address, at step 604 the normal Mobile IPv6 operation takes place. For example, the interface selection is made on the client node and the packet will be directed to the new CoA.

Figure 7:
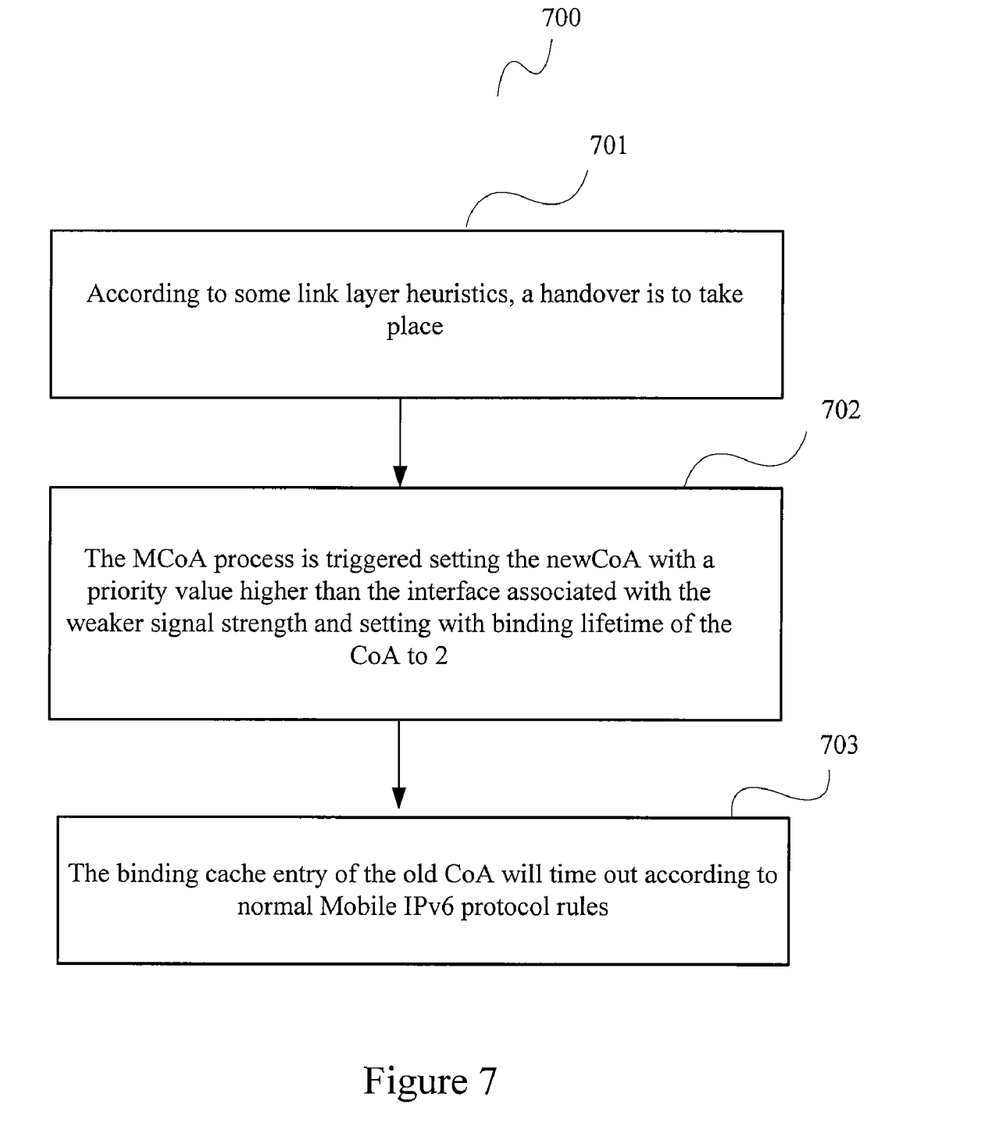
FIG. 7 is a simplified diagram illustrating the operation of routing data packets according to an embodiment of the present invention.

FIG. 7 is a simplified diagram illustrating the operation of routing data packets according to an embodiment of the present invention. This diagram is merely an example, which should not unduly limit the scope of the claims. One of ordinary skill in the art would recognize many variations, alternatives, and modifications. For example, various steps as illustrated in FIG. 7 may be added, removed, replaced, rearranged, repeated, overlapped, and/or partially overlapped. Merely as an example, the process as shown in FIG. 7 may be practiced using system 300 in FIG. 3. For example, the process illustrated in FIG. 7 is in compliance with the Mobile IP standard.

At step 701, the MCoA scheme is triggered by a link layer trigger by which a heuristic determines that the mobile device needs to switch to a different connection. At step 702, a new semantics (e.g., in compliance with the Mobile IPv6 and MCoA protocols) is made by defining that a MCoA registration is to be made with the new interface. For example, the new interface is assigned a higher priority value than the older interface. In this new MCoA, a two second binding lifetime is also given to the older interface. In addition, an MCoA registration packet is created and sent out to the HA and access routers. At the step 703, the connection between the mobile device and the old access router is torn down to conserve system resources.

According to an embodiment, the present invention provides a method for providing wireless communication. The method includes providing a first access device and a second access device in a communication network. The first access device and the second access device are configured to provide wireless connectivity. The method also includes providing a mobile device that is wirelessly connected to the first access network using a first connection. The mobile device is connected to a communication network using a first address that is associated with the first access network. The first connection is associated with a first priority level. The method further includes detecting the second access device by the mobile device. The method additionally includes determining whether to connect to the second access device based on a first condition. The method also includes obtaining a second connection between the second access device and the mobile device. Moreover, the method includes providing a second address that is associated with the mobile device and the second access network. Also, the method includes sending a registration message to a home agent. The registration message includes at least the first address, the second address, and information associated with the first connection and the second connection. The method additionally includes assigning a second priority level to the second connection. For example, the second priority level being higher than the first priority level. The method further includes setting a lifetime associated with the first connection. The method further includes routing packet data for the mobile device by the home agent to the second access network. For example, the method is illustrated according to FIG. 4.

According to another embodiment, the present invention provides a system for providing wireless communication in compliance with an Mobile IP standard The system includes a mobile device that is configured to perform wireless communication. The mobile device is associated with a first unique identification. The system also includes a first server that is configured to provide a first connection for the mobile device using a first address. The first address is associated with the first unique identification. The first connection is associated with a first priority level. The system also includes a second server that is configured to provide a second connection for the mobile device using a second address. The second address is associated with a second unique identification. The second connection is associated with a second priority level. The system further includes a third server that is configured to store information associated with the first connection and the second connection. The third server is further configured to receive a first data packet to be received by the mobile device. Moreover, the third server selects the first server if the first server the first priority level is higher. For example, the system is illustrated according to FIG. 3.

According to yet another embodiment, the present invention provides a method for providing wireless communication. The method includes providing a first access device and a second access device in a communication network. The first access device and the second access device are configured to provide wireless connectivity. The method also includes providing a mobile device that is wirelessly connected to the first access network using a first connection. The mobile device is connected to a communication network using a first address that is associated with the first access network. The first connection is associated with a first priority level. Moreover, the method includes detecting the second access device by the mobile device. The method further includes obtaining a second connection between the second access device and the mobile device. In addition, the method includes providing a second address that is associated with the mobile device and the second access network. Moreover, the method includes storing the first address and the second address by a home agent. The method additionally includes assigning a second priority level to the second connection. The second priority level is higher than the first priority level. The method further includes receiving a first data packet that is for the mobile device. Moreover, the method includes routing packet for the mobile device by the home agent based on the first priority level and the second priority level. Also, the method includes causing a termination of the first connection within a predetermined time. For example, the method is illustrated according to FIG. 4.

Many benefits are achieved by way of the present invention over conventional techniques. For example, the present technique provides an easy to use technique that is both better and compatible with conventional techniques and network standards. In some embodiments, the method provides a novel seamless and quick handover process for mobile device. By practicing embodiment of the present invention, latency time associated with handover is substantially reduced. Additionally, the method provides a process that is compatible with conventional process technology without substantial modifications to conventional equipment and processes. Depending upon the embodiment, one or more of these benefits may be achieved. These and other benefits will be described in more throughout the present specification and more particularly below.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for providing wireless communication in a communication network that includes a first access device and a second access device that are both configured to provide wireless connectivity, the method comprising:
   detecting the second access device by a mobile device, the mobile device being wirelessly connected to the first access device using a first connection, the mobile device being connected to the communication network using a first address, the first address being associated with the first access device, the first connection being associated with a first priority level;
   determining whether to connect to the second access device based on a first condition;
   obtaining a second connection between the second access device and the mobile device;
   providing a second address, the second address being associated with the mobile device and the second access device;
   sending a registration message to a home agent, the registration message including at least the first address, the second address, and information associated with the first connection and the second connection;
   Once the second connection is obtained assigning a second priority level to the second connection, the second priority level being higher than the first priority level;
   setting a lifetime associated with the first connection; and
   routing packet data for the mobile device by the home agent to the second access device based on the second priority being higher than the first priority.

2. The method of claim 1 further comprising removing information associated with the first connection by the home agent upon an expiration of the lifetime.

3. The method of claim 1 further comprising causing the first connection to terminate upon an expiration of the lifetime.

4. The method of claim 1 wherein the lifetime is set to approximately three seconds.

5. The method of claim 1 wherein the first address comprises a care-of address.

6. The method of claim 1 wherein the first condition comprises a network load condition.

7. The method of claim 1 wherein the second connection comprises an IP connection.

8. The method of claim 1 wherein the first condition comprises a signal strength level.

9. The method of claim 1 wherein the first access device comprises an access router.

10. The method of claim 1 wherein the first access device comprises a base station.

11. The method of claim 1 wherein the first access device is in compliance with a Mobile IPv6 standard.

12. A method for providing wireless communication, the method comprising:
   providing a first access device and a second access device in a communication network, the first access device and the second access device being configured to provide wireless connectivity;
   providing a mobile device, the mobile device being wirelessly connected to the first access device using a first connection, the mobile device being connected to the communication network using a first address, the first address being associated with the first access device, the first connection being associated with a first priority level;
detecting the second access device by the mobile device;
obtaining a second connection between the second access device and the mobile device;
providing a second address, the second address being associated with the mobile device and the second access device;
storing the first address and the second address by a home agent;
Once the second connection is obtained assigning a second priority level to the second connection, the second priority level being higher than the first priority level;

in response to setting the second priority level higher than the first priority level, setting a lifetime associated with the first connection;
receiving a first data packet, the first data packet being for the mobile device;
routing the data packet for the mobile device by the home agent based on the first priority level and the second priority level; and
causing a termination of the first connection within the lifetime.

* * * * *